(12) United States Patent
Hijazi et al.

(10) Patent No.: US 11,347,290 B2
(45) Date of Patent: May 31, 2022

(54) POWER MONITOR SCALING FOR AN INFORMATION HANDLING SYSTEM

(71) Applicant: Dell Products L.P., Round Rock, TX (US)

(72) Inventors: Mohammed Hijazi, Austin, TX (US); Merle J. Wood, III, Round Rock, TX (US); Christian L. Critz, Liberty Hill, TX (US); Chin-Jui Liu, Taoyuan (TW)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 15/669,266

(22) Filed: Aug. 4, 2017

(65) Prior Publication Data
US 2019/0041953 A1 Feb. 7, 2019

(51) Int. Cl.
| | |
|---|---|
| *G06F 1/3212* | (2019.01) |
| *G06F 1/324* | (2019.01) |
| *G06F 1/3234* | (2019.01) |
| *G06F 1/3287* | (2019.01) |
| *G06F 1/3296* | (2019.01) |
| *G06F 11/30* | (2006.01) |
| *G06F 11/32* | (2006.01) |

(52) U.S. Cl.
CPC ............ *G06F 1/3212* (2013.01); *G06F 1/324* (2013.01); *G06F 1/3243* (2013.01); *G06F 1/3287* (2013.01); *G06F 1/3296* (2013.01); *G06F 11/3024* (2013.01); *G06F 11/327* (2013.01)

(58) Field of Classification Search
CPC .... G06F 1/3287; G06F 1/3296; G06F 1/3243; G06F 1/3212; G06F 11/3024; G06F 11/327
See application file for complete search history.

(56) References Cited

U.S. PATENT DOCUMENTS

| | | | | |
|---|---|---|---|---|
| 2002/0191421 A1* | 12/2002 | Liao | ........................ | H02J 7/007 363/20 |
| 2004/0236969 A1* | 11/2004 | Lippert | ..................... | G06F 1/30 713/300 |
| 2005/0138437 A1* | 6/2005 | Allen | ........................ | G06F 1/26 713/300 |
| 2009/0253469 A1* | 10/2009 | Herczog | ............... | G06F 1/3203 455/573 |
| 2013/0113556 A1* | 5/2013 | Ortiz | .................... | H03G 3/3042 330/127 |
| 2013/0138984 A1* | 5/2013 | Wortham | ............... | H05B 45/00 713/320 |
| 2013/0241442 A1* | 9/2013 | Trattler | .................. | G03B 15/05 315/307 |
| 2014/0173305 A1* | 6/2014 | Uan-Zo-Li | ............ | G06F 1/3296 713/320 |
| 2015/0089260 A1* | 3/2015 | Tsutsui | .................... | G06F 1/263 713/322 |

(Continued)

*Primary Examiner* — Jaweed A Abbaszadeh
*Assistant Examiner* — Gayathri Sampath
(74) *Attorney, Agent, or Firm* — Norton Rose Fulbright US LLP

(57) ABSTRACT

Power monitor information in an information handling system may be adjusted based on a battery voltage to account for a battery discharge state. The power monitor information may be scaled higher when the battery voltage is low to encourage the system to throttle and decrease power consumption. This adjustment increases the likelihood that the battery remains within safe operating limits.

15 Claims, 4 Drawing Sheets

(56) References Cited

U.S. PATENT DOCUMENTS

| | | | |
|---|---|---|---|
| 2015/0121112 A1* | 4/2015 | Wei | H04W 52/0264 |
| | | | 713/324 |
| 2015/0340898 A1* | 11/2015 | Schwartz | G06F 1/266 |
| | | | 320/103 |
| 2016/0070330 A1* | 3/2016 | Yang | G06F 1/324 |
| | | | 713/320 |
| 2016/0299551 A1* | 10/2016 | Wu | G06F 1/3287 |
| 2016/0378165 A1* | 12/2016 | Krishnappa | G06F 1/3287 |
| | | | 713/320 |

* cited by examiner

POWER MONITOR SCALING FOR AN INFORMATION HANDLING SYSTEM

FIELD OF THE DISCLOSURE

The instant disclosure relates to information handling system. More specifically, portions of this disclosure relate to managing power consumption in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems conventionally include a battery to allow operation away from a main power source. Travelers often operate such a portable system on a plane, in a meeting, or otherwise away from a conventional office with a wall plug. Although the battery provides a portable source of power to operate the portable system, the behavior of the battery differs from that of a wall plug. The differences are caused by the wall plug being a nearly infinite source of energy, whereas the battery is a finite source of energy. As the finite source of energy in the battery is depleted the battery behaves differently. For example, as shown in graph 100 of FIG. 1, the battery voltage decreases as the battery is depleted. The voltage may vary +/−20% from a nominal voltage. In contrast, the voltage at a wall plug is generally a very constant value with little variation over time.

The voltage and current from a battery are mathematically-related values. For a constant demand from the portable system, the current drawn from the battery increases as the battery voltage decreases. A current from a battery is shown in graph 200 of FIG. 2 over the same time period as the graph 100 in FIG. 1. The current drawn from the battery gradually increases over discharge time while the voltage decreases. Power dissipated internal to the battery is proportional to current drawn. The additional power causes the battery to increase in temperature, which may cause a fire. Batteries are rated for a maximum safe current value, and an example rating is shown as threshold 210. At time 202, the battery exceeds the maximum current and continues to increase above the maximum. This is dangerous for the user of the portable system and decreases the life of the battery.

SUMMARY

Information handling systems can include power monitor circuitry configured to monitor total system power consumption. The power monitor information is provided to the logic circuitry in the system from a charger power monitor via an analog output signal proportional to total system power consumption. When the system is running from AC only, the signal reflects power consumed from the AC adapter. When the system is running from battery the signal reflects battery discharge power. Logic circuitry in the system can use the power monitor information to manage system power consumption. For example, when power consumption is high, logic circuitry in the system may throttle performance of some system components (e.g., a CPU) to reduce power consumption. However, the power monitor information reflects consumed power, which is related but different from current drawn from the battery. The power monitor information alone is insufficient to determine whether a battery is exceeding its maximum safe current value. Thus, conventional systems may frequently exceed the safe battery limits, particularly at the end of a discharge cycle when the system is heavily loaded, battery voltage is low, and the current drawn is high. According to embodiments of the disclosure, the power monitor information may be adjusted based on a battery voltage to account for battery discharge state. The power monitor information may be scaled higher when the battery voltage is low to encourage the system to throttle and decrease power consumption. This increases the likelihood that the battery remains within safe operating limits.

A method of operating an information handling system may include the steps of receiving an indication of battery charge level of a battery for an information handling system; receiving a system power level of system power consumption by the information handling system; and scaling the received system power level based on the battery charge level when the battery charge level is below the threshold.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some hardware and software in an information handling system may be used to monitor and control system power consumption. For example, an embedded controller (EC), a basic input/output system (BIOS), and/or supporting circuitry may be configured to monitor and adjust a power monitor signal generated by a power supply. The power monitor signal may be adjusted to compensate for a battery voltage that changes over time with the discharge level of the battery. The adjusted power monitor signal may be used by the EC, BIOS, or other circuitry to control components within the information handling system to reduce power consumption and maintain current draw from the battery within specified safety limits. For example, a total dissipated power (TDP) of a central processing unit (CPU) may be adjusted downward to throttle the processor to reduce system power consumption. As another example, a discrete graphics processor may be deactivated to reduce system power consumption. An example method for operating an information handling system by adjusting a power monitor signal is described with reference to FIG. 3.

Figure 3:
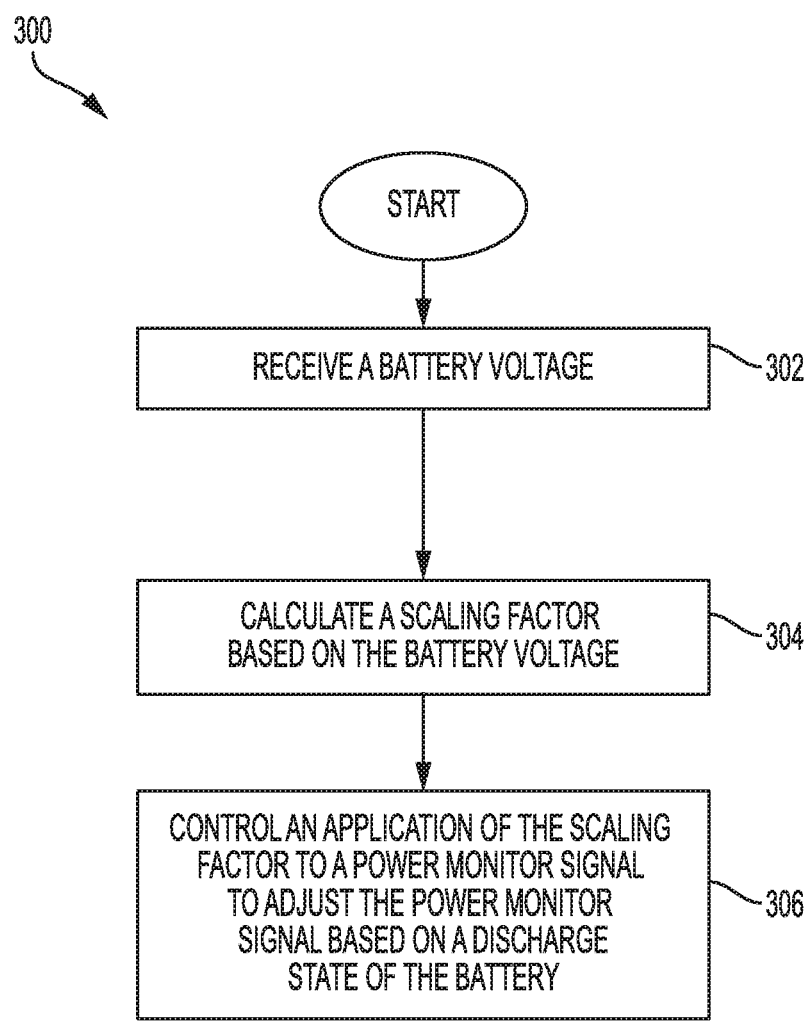
FIG. 3 is a flow chart illustrating an example method for adjusting a power monitor signal based on battery voltage according to some embodiments of the disclosure.

FIG. 3 is a flow chart illustrating an example method for adjusting a power monitor signal based on battery voltage according to some embodiments of the disclosure. A method 300 begins at block 302 with receiving a battery voltage, which is indicative of a discharge state of the measured battery. At block 304, a scaling factor may be computed based on the received battery voltage. The computation may be performed by, for example, a difference amplifier that receives the battery voltage and computes the scaling factor according to a feedback loop around the difference amplifier. At block 306, the scaling factor may be applied to a power monitor signal to adjust the power monitor signal based on a discharge state of the battery. For example, the difference amplifier may generate an error signal that when applied to the power monitor signal results in scaling of the power monitor signal to compensate for a drop in the battery voltage resulting from discharge of the battery.

Figure 4:
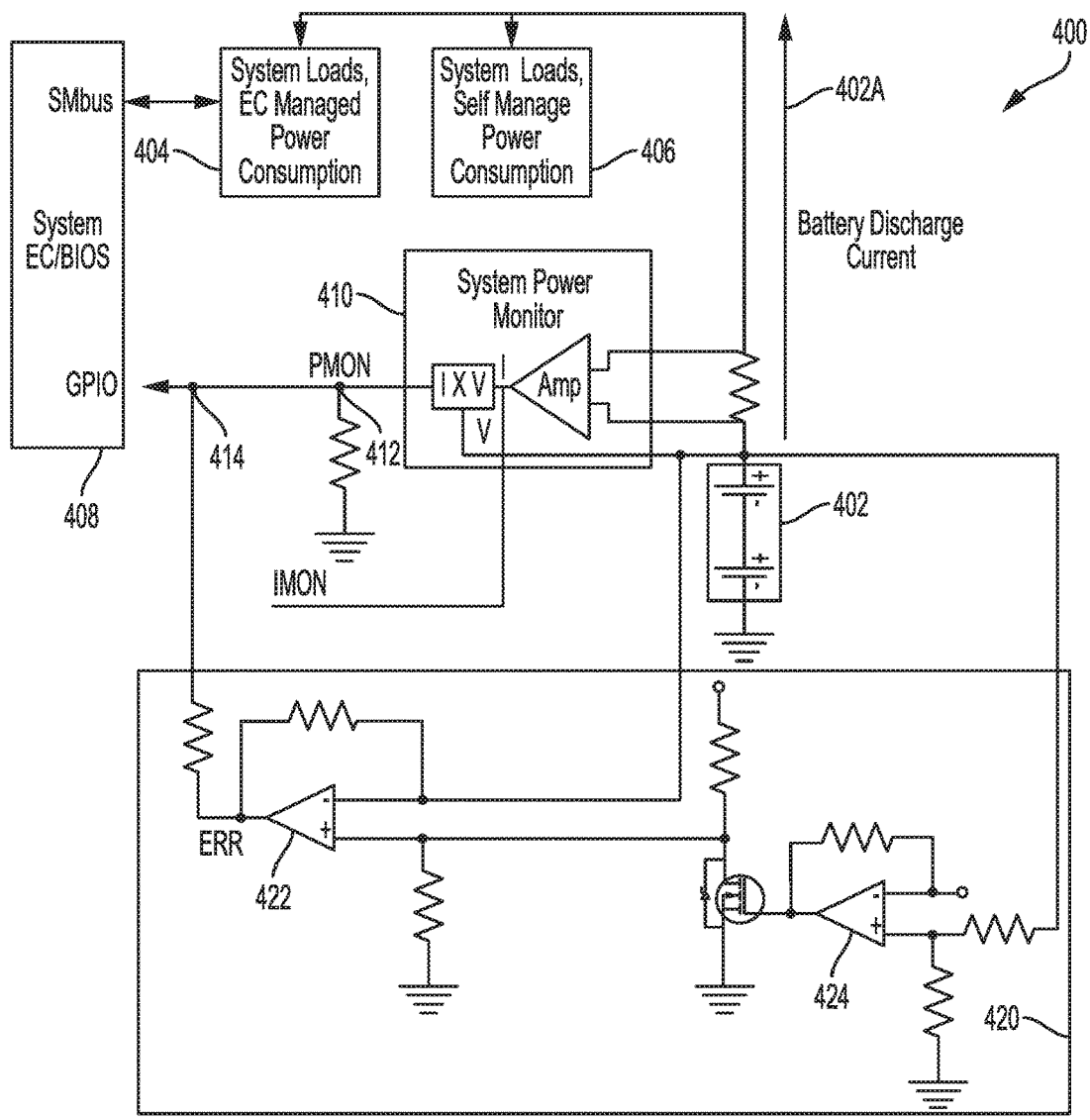
FIG. 4 is a circuit schematic illustrating an example circuit for adjusting a power monitor signal based on battery voltage according to some embodiments of the disclosure.

An example circuit for implementing the method of FIG. 3 using a differential amplifier is shown in FIG. 4. FIG. 4 is a circuit schematic illustrating an example circuit for adjusting a power monitor signal based on battery voltage according to some embodiments of the disclosure. A battery 402 of a portion 400 of an information handling system may be used to power system loads 404 and 406. Battery discharge current 402A flows from the battery 402 to the loads 404 and 406. The battery 402 has a maximum safe discharge current that the discharge current 402A should not exceed. An embedded controller (EC) 408, or BIOS, may control power consumption in system loads 404 through a system management bus (SMbus). Circuitry may be coupled to the battery 402 to monitor the battery 402. For example, a system power monitor 410 may be coupled to a terminal of the battery 402 and used to monitor a battery voltage or a discharge current. An output of the power monitor 410 is a power monitor signal PMON, which may be an analog signal representing a value between zero and one corresponding to a level of power consumed by the information handling system.

A power monitor adjustment circuit 420 may be coupled to the battery 402 and configured to generate an error signal that compensates the power monitor signal for the battery voltage. The adjustment circuit 420 may include a difference amplifier 422, which is coupled at one input terminal to the battery 402. When activated, the difference amplifier 422 generates an error signal ERR, which may correspond to a scaling factor for the power monitor signal PMON. The error signal ERR is used to scale the power monitor signal PMON by adding the error signal ERR to the power monitor signal PMON at node 414 before the PMON signal is received by the EC 408.

Figure 1:
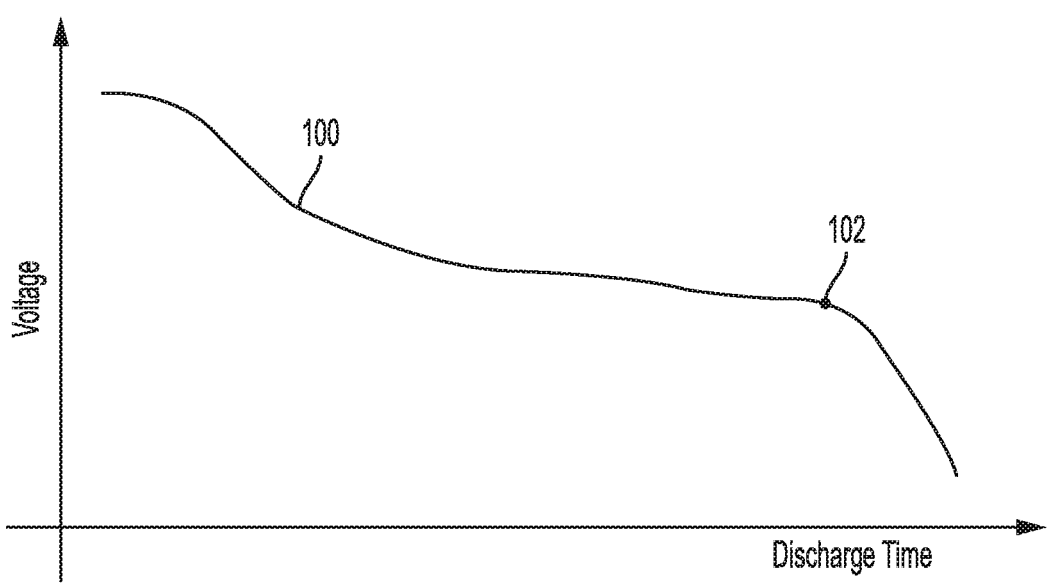
FIG. 1 is a graph illustrating battery voltage variation over time.

The difference amplifier 422 may be activated or deactivated based on the power supply conditions. The difference amplifier 422 may be deactivated when an AC adapter is coupled to and providing current to the loads 404 and 406. The difference amplifier 422 may be deactivated when an AC adapter is disconnected such that the battery 402 is supplying current to the loads 404 and 406 but the battery voltage is above a threshold level. When the battery voltage decreases to below a threshold level, the difference amplifier 422 may be activated to begin adjusting the power monitor signal PMON based on the decreasing battery voltage. A comparator 424, included in the adjustment circuit 420, may be used to determine when to activate the difference amplifier 422. The comparator 424 compares the voltage of the battery 402 to a threshold level. When the battery voltage decreases below that level, the comparator 424 activates the difference amplifier 422. The threshold level for the comparator 424 may be set to be approximately equal to the voltage at which the voltage decrease accelerates. For example, referring to FIG. 1, the threshold level may be set at the level corresponding to point 102 when the voltage begins rapidly decreasing with further discharge. On a battery with a nominal voltage of 7.5 Volts, the threshold level for activating compensation may be 7.03 Volts. By appropriately setting the threshold level, the difference amplifier 422 is activated shortly before the battery is likely to exceed safe current draw limits.

The EC 408 receives the adjusted power monitor signal PMON from node 414 and controls the information handling system appropriately. The EC 408 may be unaware of the adjustment circuit 420 or the adjustment to the power monitor signal PMON. The EC 408 controls system loads 404 based, in part, on the PMON signal received at a general-purpose input/output (GPIO) pin. Thus, the adjustment performed by circuit 420 manipulates the EC 408 to scale system power consumption when the battery voltage decreases below a threshold.

Figure 2:
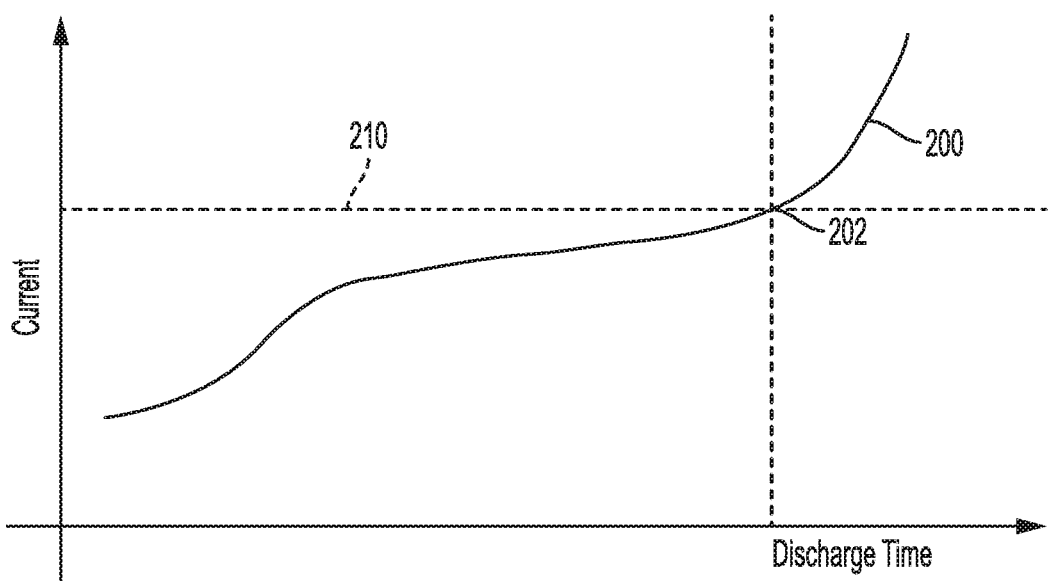
FIG. 2 is a graph illustrating battery current draw over time.
Figure 5:
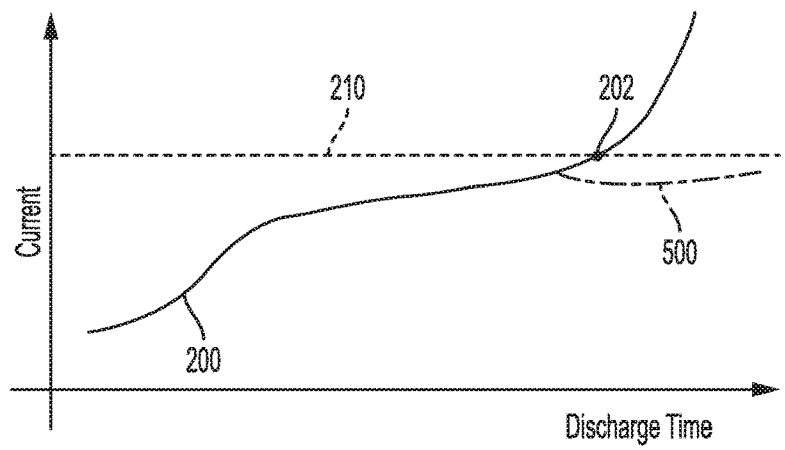
FIG. 5 is a graph illustrating battery current draw over time using an adjusted power monitor signal according to some embodiments of the disclosure.

The compensation applied by the adjustment circuit 420 reduces the current draw from the battery to maintain safe operating conditions. FIG. 5 is a graph illustrating battery current draw over time using an adjusted power monitor signal according to some embodiments of the disclosure. The line 200 is similar to that shown in FIG. 2 for current draw from the battery over discharge time. Prior to the current draw exceeding the safe level 210 at time 202, adjustments are applied to the power monitor signal PMON to reduce power consumption. With the applied compensation, the current draw follows line 500, which remains below the safe limit 210.

Figure 6:
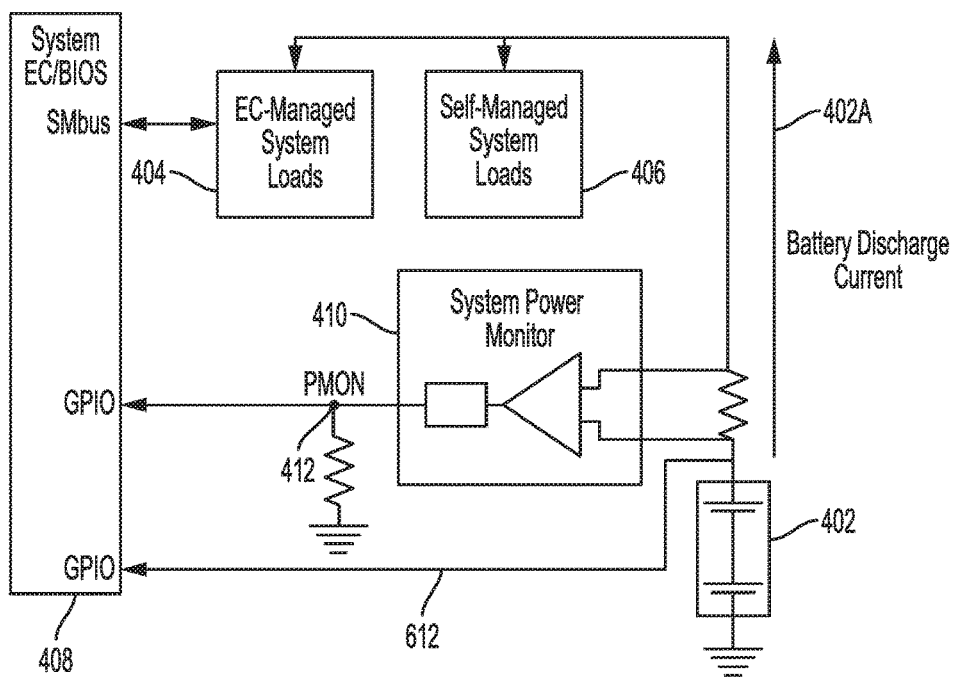
FIG. 6 is a circuit diagram illustrating adjusting a power monitor signal based on battery voltage using an embedded controller according to some embodiments of the disclosure.

The adjustment of the PMON signal may be performed by scaling with the circuit 420 of FIG. 4. However, the scaling can be performed in other circuitry. For example, the EC 408 may perform scaling of the PMON signal internally before controlling the system load 404. FIG. 6 is a circuit diagram illustrating adjusting a power monitor signal based on battery voltage using an embedded controller according to some embodiments of the disclosure. An EC 408 may receive the power monitor signal PMON from node 412 at a GPIO pin. The EC 408 may also receive a measurement 612 of the battery voltage at another GPIO pin. The EC 408 may perform processing of the PMON signal based on the received battery voltage to adjust the PMON signal. The internally-adjusted PMON signal may then be used to determine how to control system load 404.

Figure 7:
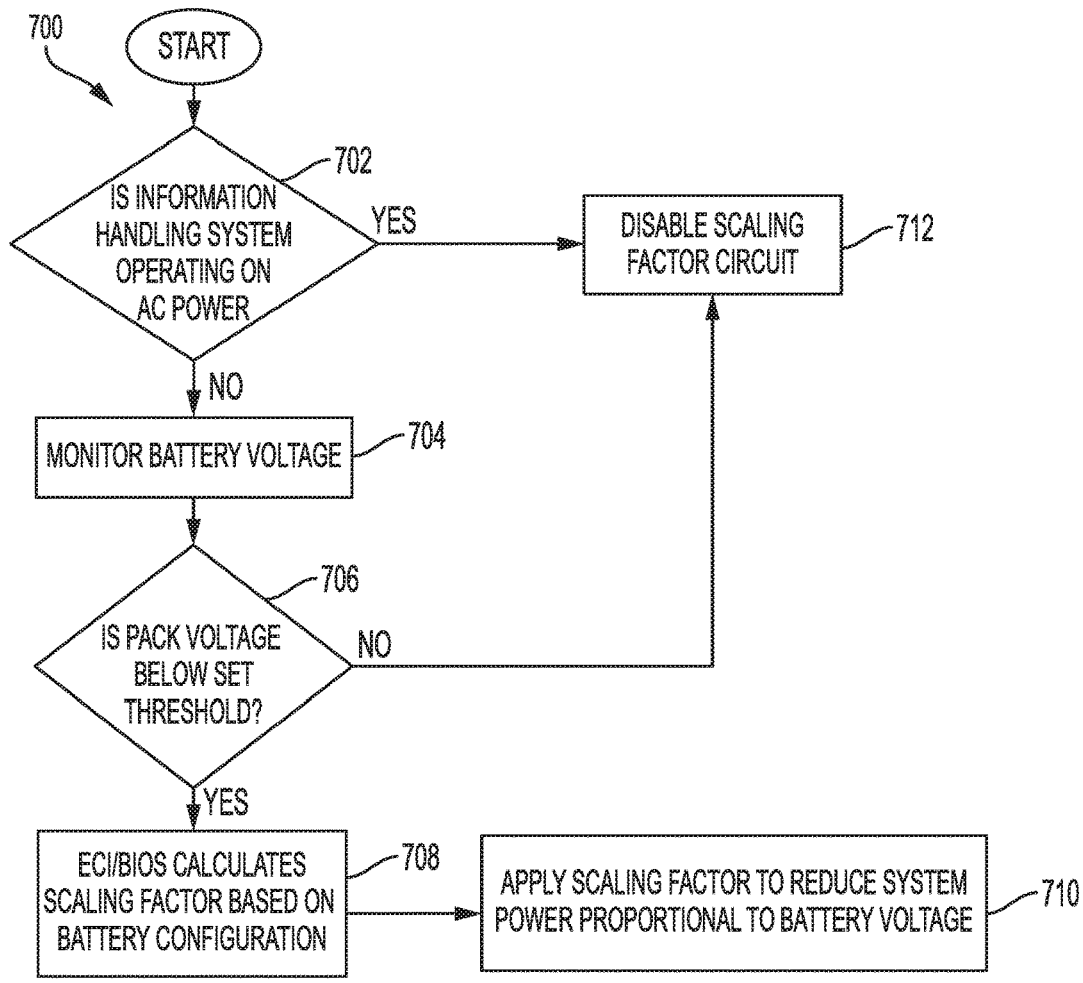
FIG. 7 is a flow chart illustrating an example method for conditionally adjusting a power monitor signal based on battery voltage according to some embodiments of the disclosure.

The EC 408, or other logic circuitry, may be configured to perform a method of processing the power monitoring signal. One such method is illustrated in FIG. 7. FIG. 7 is a flow chart illustrating an example method for conditionally adjusting a power monitor signal based on battery voltage according to some embodiments of the disclosure. A method 700 begins at block 702 with determining whether the information handling system is operating on AC power. If so, the PMON scaling is disabled at block 712. If the system is operating on battery power, the method 700 continues to block 704. At block 704, the battery voltage is monitored and, at block 706, compared to a threshold level. If the battery level is not below a threshold level, the scaling is disabled at block 712. If the battery level is below the threshold level, then the EC calculates a scaling factor based on the battery voltage and/or pre-configured information. For example, a known battery configuration, such as nominal voltage level, number of cells, chemistry, and the like, may be factored in to the scaling calculation. At block 710, the determined scaling factor may be applied to the power monitor signal PMON. The system power consumption may be controlled based on the scaled power monitor signal PMON. Functionality described with respect to FIG. 3 and FIG. 7 for calculating and applying a scaling factor may be performed in a controller, such as EC 408, or other circuit, such as adjustment circuit 420.

The schematic flow chart diagrams of FIG. 3 and FIG. 7 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general-purpose processor capable of executing instructions contained in software. If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, where voltage monitoring is described, current monitoring may be substituted without changing the manner of operation of the circuit or method. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

What is claimed is:

1. A method, comprising:
receiving an indication of battery charge level of a battery for an information handling system, wherein the step of receiving the indication of battery charge level comprises receiving a battery voltage, and wherein the battery voltage indicates the battery charge level changing over time with a discharge level of the battery;
receiving a system power consumption level value indicative of system power consumption at a first time by the information handling system;
scaling the received system power consumption level value based on the battery charge level in response to the battery charge level being below a threshold, the scaling is performed while the battery is discharging to obtain a scaled system power level value indicative of the system power consumption at the first time; and
controlling system power consumption based, at least in part, on the scaled system power level value prior to the system power consumption exceeding a safe current draw limit of the battery.

2. The method of claim 1, wherein the step of scaling the received system power level value comprises scaling with a difference amplifier by injecting an error signal to the system power level received from a power monitor signal.

3. The method of claim 1, wherein controlling system power consumption based, at least in part, on the scaled system power level value comprises maintaining the battery within a battery maximum continuous discharge specification of the battery.

4. The method of claim 1, wherein the step of scaling comprises scaling the received system power level value only when the information handling system is operating from the battery.

5. An information handling system, comprising:
an integrated circuit configured to perform steps comprising:
receiving an indication of battery charge level of a battery for an information handling system, wherein the step of receiving the indication of battery charge level comprises receiving a battery voltage, and wherein the battery voltage indicates the battery charge level changing over time with a discharge level of the battery;
receiving a system power consumption level value indicative of system power consumption at a first time by the information handling system;
scaling the received system power consumption level value based on the battery charge level in response to the battery charge level being below a threshold, the scaling is performed while the battery is discharging to obtain a scaled system power level value indicative of the system power consumption at the first time; and
controlling system power consumption based, at least in part, on the scaled system power level value prior to the system power consumption exceeding a safe current draw limit of the battery.

6. The information handling system of claim 5, wherein the step of scaling the received system power level value comprises scaling with a difference amplifier by injecting an error signal to power monitor signal.

7. The information handling system of claim 5, wherein controlling system power consumption based, at least in part, on the scaled system power level value comprises maintaining the battery within a battery maximum continuous discharge specification.

8. The information handling system of claim 5, wherein the step of scaling comprises scaling the received system power level value only when the information handling system is operating from the battery.

9. An apparatus, comprising:
a system power monitor coupled to a battery and configured to output a power monitor signal correlated to a system load at a first time on the battery;
an adjustment circuit coupled to the system power monitor and configured to generate an error signal for compensating the power monitor signal, the error signal based on the power monitor signal corresponding to the system load at the first time to obtain a compensated power monitor signal indicative of a system power consumption at the first time, wherein the adjustment circuit comprises:

a difference amplifier coupled to the battery and configured to generate the error signal based, at least in part, on a battery voltage level;

a comparator coupled to the battery and the difference amplifier and configured to activate the difference amplifier when the battery voltage level is below a threshold level; and an embedded controller coupled to receive the compensated power monitor signal and configured to control the system load based, at least in part, on the compensated power monitor signal prior to the system power consumption exceeding a current draw limit of the battery, wherein the compensated power monitor signal is based on a battery charge level and a system power level value.

10. The apparatus of claim 9, wherein the embedded controller is configured to control a power consumption of a central processing unit of an information handling system.

11. The apparatus of claim 9, wherein the adjustment circuit is configured to compensate the power monitor signal to maintain a current draw below the current draw limit for the battery.

12. The apparatus of claim 9, wherein the apparatus comprises an information handling system, and the system load comprises components of the information handling system.

13. The apparatus of claim 9, wherein the embedded controller is further configured to generate an internal error signal for compensating the power monitor signal for a discharge state of the battery and to control a power consumption of a central processing unit of an information handling system.

14. The method of claim 1, wherein controlling the system power consumption comprises reducing system power consumption when the scaled system power level value is higher than the received system power level value.

15. The information handling system of claim 5, wherein the integrated circuit is configured to perform steps comprising reducing system power consumption when the scaled system power level value is higher than the received system power level value.

* * * * *